United States Patent
Gibb et al.

(10) Patent No.: US 6,783,884 B2
(45) Date of Patent: Aug. 31, 2004

(54) FLOW FIELD PLATE ASSEMBLY FOR AN ELECTROCHEMICAL FUEL CELL

(75) Inventors: Peter R. Gibb, Coquitlam (CA); Neil V. Davis, New Westminster (CA); Emerson R. Gallagher, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 154 days.

(21) Appl. No.: 10/122,048

(22) Filed: Apr. 12, 2002

(65) Prior Publication Data

US 2003/0194595 A1 Oct. 16, 2003

(51) Int. Cl.[7] .............................................. H01M 8/02
(52) U.S. Cl. ........................................ 429/38; 429/39
(58) Field of Search .............................. 429/34, 35, 38, 429/39

(56) References Cited

U.S. PATENT DOCUMENTS

| | | | |
|---|---|---|---|
| 4,169,917 A | 10/1979 | Baker et al. ................... | 429/26 |
| 4,276,355 A | 6/1981 | Kothmann et al. ........... | 429/26 |
| 4,324,844 A | 4/1982 | Kothmann .................... | 429/26 |
| 4,489,142 A | 12/1984 | Chi et al. ...................... | 429/26 |
| 5,736,269 A | * 4/1998 | Okamoto et al. ............. | 429/32 |
| 5,776,624 A | * 7/1998 | Neutzler ....................... | 429/26 |
| 6,037,073 A | 3/2000 | Besmann et al. ............. | 429/34 |
| 6,080,502 A | * 6/2000 | Nolscher et al. ............. | 429/34 |
| 6,165,634 A | * 12/2000 | Krasij et al. .................. | 429/35 |
| 6,238,817 B1 | * 5/2001 | Reiser .......................... | 429/34 |
| 6,372,376 B1 | * 4/2002 | Fronk et al. .................. | 429/41 |

FOREIGN PATENT DOCUMENTS

| | | | | |
|---|---|---|---|---|
| JP | 2000208153 A | * | 7/2000 | ............ H01M/8/02 |
| WO | WO 00/41260 | | 7/2000 | |

* cited by examiner

Primary Examiner—Gregg Cantelmo
(74) Attorney, Agent, or Firm—McAndrews, Held & Malloy, Ltd.

(57) ABSTRACT

A flow field plate assembly for an electrochemical fuel cell comprises two flow field plates, each of which has channels formed on an inner surface of the plate. The plates are alignable with and engage each other such that their cooperating inner surfaces form at least one inner coolant fluid channel. The coolant channel has an essentially constant cross-sectional perimeter along its length, which is defined by the perimeters of the channels of the two plates and their difference in width at the cooperating plate surfaces. Additionally, a flow field plate assembly, which comprises a corrugated flow field plate and a staggered flow field plate, is structurally stronger under compressive load during the fuel cell operation.

14 Claims, 4 Drawing Sheets

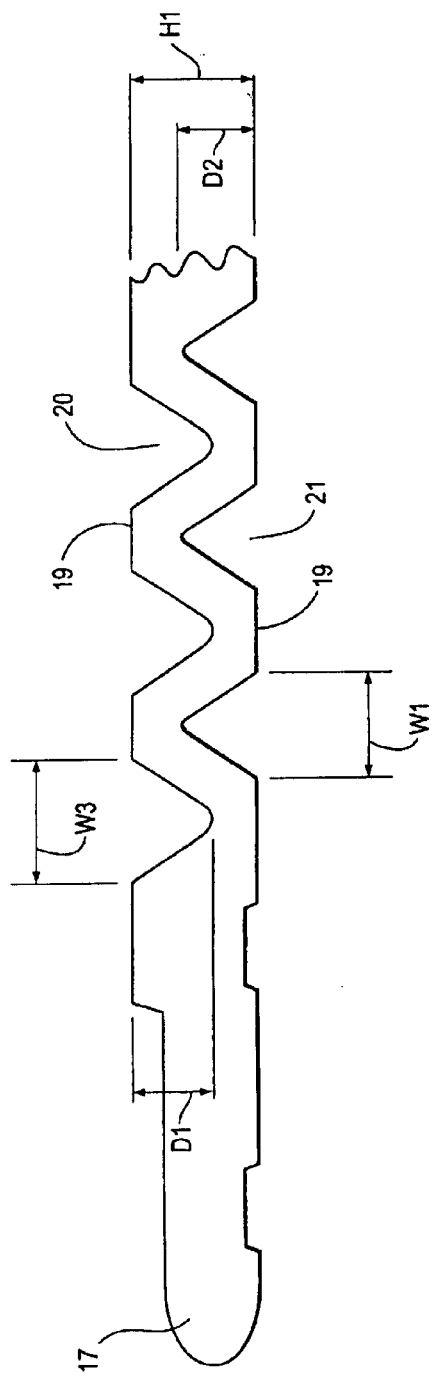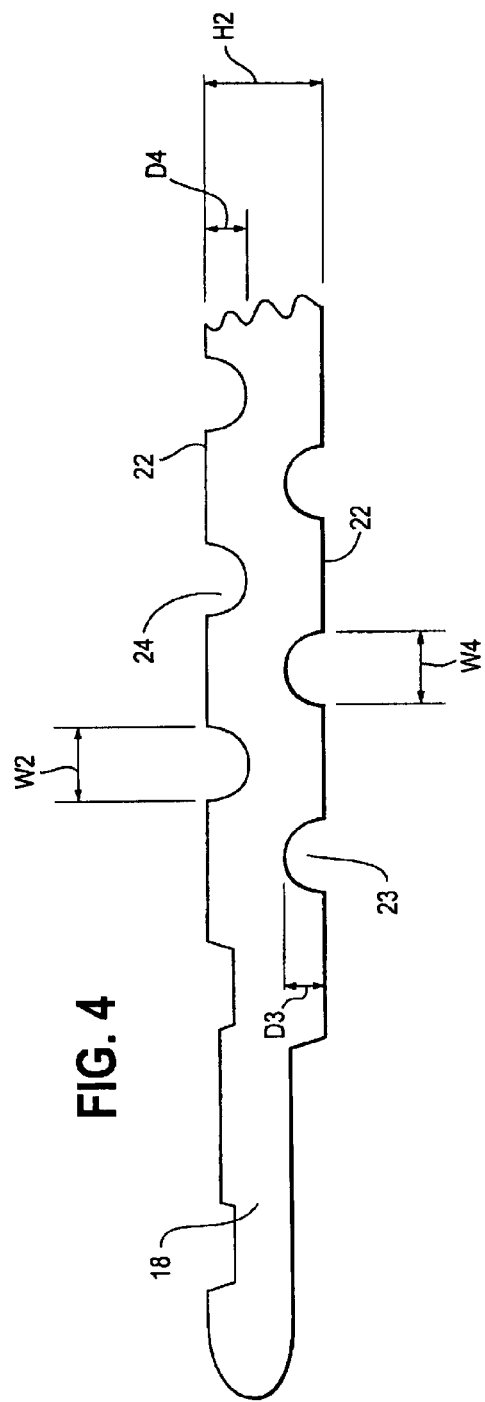

FLOW FIELD PLATE ASSEMBLY FOR AN ELECTROCHEMICAL FUEL CELL

FIELD OF THE INVENTION

The present invention relates to a flow field plate assembly for fuel cells. More particularly, the invention relates to a flow field plate assembly comprising two flow field plates that engage each other on their inner surfaces such that each inner channel on the inner surface of one plate overlaps an inner channel on the inner surface of the other plate essentially along its entire length. The present invention also relates to a flow field plate assembly comprising two flow field plates, one supporting the other against spreading under compressive load.

BACKGROUND OF THE INVENTION

Fuel cell systems are currently being developed for numerous applications, such as automobiles and stationary power plants, where they will be used to economically deliver power with significant environmental benefits.

Preferred fuel cell types include solid polymer fuel cells that comprise a solid polymer electrolyte, otherwise referred to as an ion exchange membrane, and operate at relatively low temperatures. The membrane is disposed between two electrodes, namely a cathode and an anode, forming a membrane electrode assembly ("MEA"). Each electrode contains a catalyst layer, comprising an appropriate catalyst, located next to the solid polymer electrolyte. The catalyst induces the desired electrochemical reactions at the electrodes. During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons pass through an external circuit, creating a flow of electricity.

The MEA is typically disposed between two plates to form a fuel cell assembly. The plates act as current collectors and provide support for the adjacent electrodes. The assembly is typically compressed to ensure good electrical contact between the plates and the electrodes, in addition to good sealing between fuel cell components. A plurality of fuel cell assemblies may be combined in series or in parallel to form a fuel cell stack. In a fuel cell stack, a plate may be shared between adjacent fuel cell assemblies, in which case the plate also serves as a separator to fluidly isolate the fluid streams of the two adjacent fuel cell assemblies.

In a fuel cell, these plates on either side of the MEA may incorporate flow fields for the purpose of directing reactants across the surfaces of the fluid diffusion electrodes or electrode substrates. The flow fields comprise fluid distribution channels separated by landings. The channels provide passages for the distribution of reactant to the electrode surfaces and also for the removal of reaction products and depleted reactant streams. The landings act as mechanical supports for the fluid diffusion layers in the MEA and provide electrical contact thereto.

Since, during operation, the temperature of the fuel cell may increase considerably and needs to be controlled within admissible limits, flow field plates may also include channels for directing coolant fluids along specific portions of the fuel cell.

An illustration of a fluid flow field plate including coolant fluid channels is described in PCT/International Publication No. WO 00/41260, which is incorporated herein by reference in its entirety. This publication describes a fluid flow field plate in which a major surface is provided with open channels facing the flat surface of another flow field plate. The closed channel formed by the cooperating surfaces of these two plates is used to direct a coolant fluid therethrough.

In an effort to increase and maximize the cross-sectional area of channels in a given plate volume, flow field plates have been contemplated in which channels are incorporated on both surfaces in a corrugated-like fashion. If made of expanded graphite such plates are easy to manufacture and they offer increased thermal and electrical conductivity due to the orientation of the graphite flakes. These plates can have the disadvantage that they may be relatively weak structurally and their channels tend to collapse under compressive load, thereby causing the channel cross-section to change during the operation of the fuel cell.

Expanded graphite sheets, such as those available from UCAR Carbon Technology Corp. (Danbury, Conn., USA) under the tradename GRAFOIL, are advantageously employed as the sheet material from which flow field and separator plates for fuel cells can be formed. In this regard, expanded graphite sheets are well suited for incorporation into fuel cell assemblies, as well as in the manufacture of fuel cell assemblies, particularly because expanded graphite sheets are electrically conductive, chemically stable in fuel cell environments, relatively light, flexible and amenable to low-cost manufacturing methods, such as embossing.

It would be desirable to have a flow field plate assembly comprising two flow field plates, preferably made of expanded graphite, that preserves the advantages of the efficient use of plate volume and the improved thermal and electrical conductivity given by corrugated types of plates while keeping a controlled cross-section for the channels.

It would also be desirable to have a flow field plate assembly that is structurally stronger under compressive load during fuel cell operation thereby preventing deformation of the channels.

SUMMARY OF THE INVENTION

A flow field plate assembly comprises two flow field plates that engage each other on their inner surfaces such that the engaged inner channels of each plate define at least one closed inner flow field channel with each inner channel of the second flow field plate overlapping an inner channel of the first field plate essentially along its entire length. A flow field plate assembly, which resists deformation under compressive load, comprises a staggered flow field plate and a corrugated flow field plate.

Herein, the term "overlapping" is defined to mean that each inner channel of the second plate is entirely contained within an inner channel of the first plate.

Herein, the term "corrugated plate" is defined to mean a plate provided with open inner and outer channels alternating over the planar direction of the plate and having a thickness which is smaller than the sum of the inner and outer channel depths. A "staggered plate" is defined to mean a plate provided with open inner and outer channels alternating over the planar direction of the plate whose thickness is greater than the sum of the inner and outer channel depths.

The first flow field plate of the flow field plate assembly is provided with open inner channels on the inner surface of the plate having a width $W_1$ at the inner surface of the plate and open outer channels on the outer surface of the plate. The second flow field plate of the assembly is provided with open inner channels on the inner surface of the plate having a width $W_2$ at the inner surface of the plate smaller than $W_1$, and open outer channels on the outer surface of the plate. The inner surface of the second flow field plate aligns with and engages the inner surface of the first flow field plate such that the engaged inner channels of each plate define at least one closed inner flow field channel with each inner channel of the second flow field plate overlapping an inner channel of the first flow field plate essentially along its entire length. The cross-sectional perimeter of the closed inner flow field channel is the sum of the perimeters of the open inner channels of the first and second flow field plates and the difference ($W_1-W_2$) between the widths of the open inner channels.

The outer channels of the two plates of the assembly represent the flow field for the reactants circulated in the fuel cell, fuel (for example, hydrogen or methanol) and oxidant (for example, oxygen or oxygen-containing air). The closed inner flow field is used for circulating coolant fluid in the fuel cell.

Both plates in the flow field plate assembly can be made of a moldable (embossable) material such as, for example, expanded graphite.

The first flow field plate of the above-described assembly can be corrugated and the second flow field plate can be staggered.

A method of making a flow field assembly as described above involves aligning and engaging the inner surface of the first flow field plate with the inner surface of the second flow field plate, such that the engaged inner channels of each plate define at least one closed inner flow field channel with each inner channel of the second flow field plate overlapping an inner channel of the first flow field plate essentially along its entire length.

A flow field plate assembly is also provided that resists deformation under compressive load and comprises a first corrugated plate that tends to spread under compressive load and is therefore supported by a second staggered plate. The corrugated plate, which has open inner channels formed on the inner surface of the plate and open outer channels formed on the outer surface of the plate alternating in the planar direction of the plate, has a thickness smaller than the sum of the inner and outer channel depths. The staggered plate, which has open inner and outer channels formed therein that alternate over the planar direction of the plate, has a thickness greater than the sum of the inner and outer channel depths.

The corrugated and the staggered plate can be made of a moldable (embossable) material such as, for example, expanded graphite.

A method of making a flow field plate assembly as described above involves aligning and engaging a corrugated flow field plate with a staggered flow field plate such that the inner channels of each plate define a closed inner flow field, whereby the staggered plate supports the corrugated plate against spreading under compressive load.

The fuel cell comprising the flow field plate assembly described above is preferably a solid polymer electrolyte fuel cell.

BRIEF DESCRIPTION OF THE DRAWINGS

FIG. 3 is a cross-sectional view of the first flow field plate of FIG. 2.

FIG. 4 is a cross-sectional view of the second flow field plate of FIG. 2.

DETAILED DESCRIPTION OF PREFERRED EMBODIMENT(S)

Figure 1:
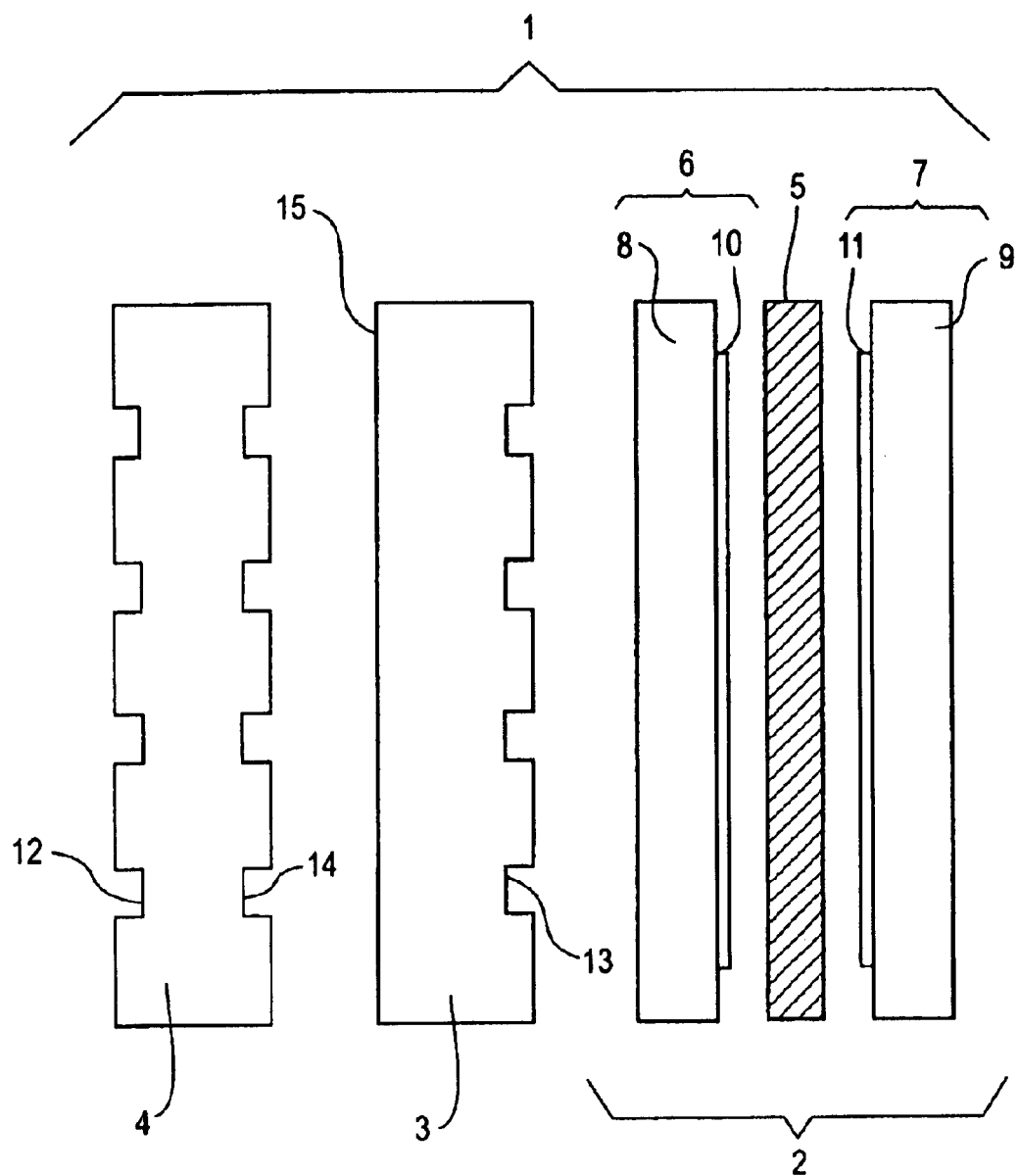
FIG. 1 is an exploded side view of a conventional fuel cell assembly, showing one membrane electrode assembly and the corresponding reactant and coolant fluid flow field plates.

FIG. 1 illustrates a conventional fuel cell assembly. For simplicity, a single cell, from a fuel cell stack is represented. It is to be understood that this represents a repeating unit of the fuel cell stack.

This repeating unit 1 includes one membrane electrode assembly (MEA) 2 interposed between a flow field plate 3 and a flow field plate in an adjacent unit (not shown), similar to plate 4. The MEA comprises a solid polymer ion exchange membrane 5 sandwiched between an anode 6 and a cathode 7. The anode 6 and cathode 7 each contain a fluid diffusion layer 8 and 9 respectively and a catalyst layer 10 and 11 respectively, on the sides facing the membrane 5. Fluid distribution layers 8 and 9 serve as electrically conductive backings and mechanical supports for catalyst layers 10, 11, but fluid distribution layers 8 and 9 also serve to distribute the reactants from the flow field plates to the catalyst layer. The reactants, typically hydrogen and oxygen or oxygen-containing air, are supplied to the flow field plates 3 and 4 and then delivered through the fluid distribution channels 13 and 12 of the flow fields to the surfaces of the fluid distribution layers 8 and 9.

As shown in FIG. 1 the flow field plate 4 contains channels 14 on the side facing the flat surface 15 of the flow field plate 3. The cooperating sides of the channel 14 and the flat surface 15 form a closed inner flow field channel for carrying a coolant fluid, typically water.

Figure 2:
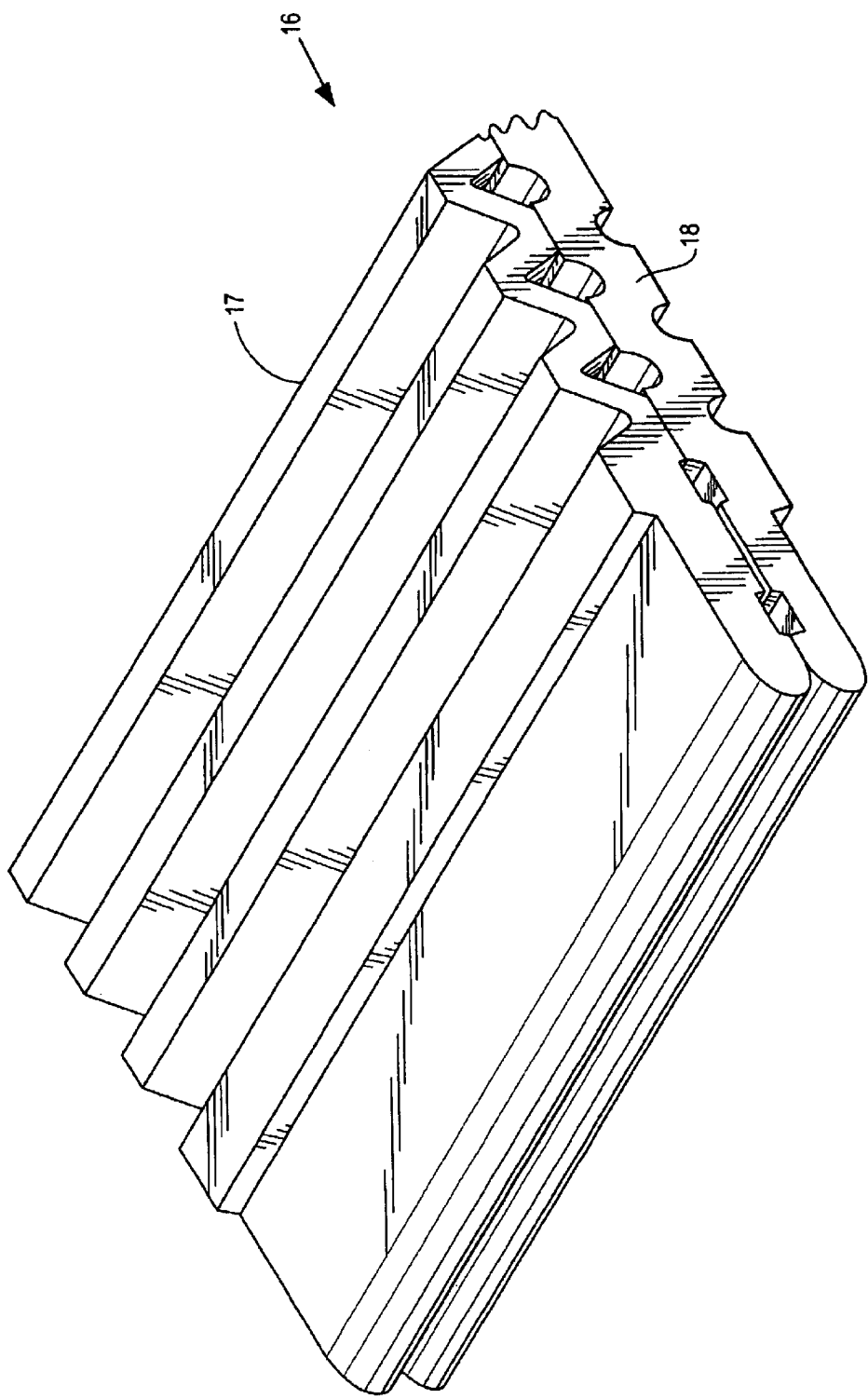
FIG. 2 is a perspective view of a flow field plate assembly showing two flow field plates aligned and assembled together in accordance with the present disclosure.

The flow field plate assembly 16 depicted in FIG. 2 achieves an inner closed flow field with a controlled cross-section and is resistant to deformation under compressive load. It comprises a first corrugated flow field plate 17 and a second staggered flow field plate 18 aligned and engaging each other on their inner surfaces.

The first flow field plate 17 represented in FIG. 3 is provided with landings 19 which form the walls of the open outer channels 20 and open inner channels 21 which alternate in the planar direction of the plate. The outer channels 20 have a depth of $D_1$ and a width $W_3$ at the surface of the plate. The inner channels 21 have a depth of $D_2$ and a width $W_1$ at the surface of the plate. As depicted in FIG. 3 the widths of the outer and inner channels at the surface of the plate are equal to each other, and so are the channels depths ($W_1=W_3$ and $D_1=D_2$). The channel dimensions can be different from one another ($W_1 \neq W_3$ and $D_1 \neq D_2$) and the width $W_1$ can vary from one inner channel to another.

As shown in FIG. 3 the plate thickness $H_1$ is smaller than the sum of the inner and outer channel depths ($H_1<D_1+D_2$) and therefore the plate is a typical corrugated plate. Flow channels 20 constitute the flow field of plate 17 through which the oxidant (typically oxygen or oxygen-containing air) could be distributed to the fuel cell cathode.

The second flow field plate 18 of the flow field plate assembly 16 shown in FIG. 4 is provided with landings 22 which form the walls of the open outer channels 23 and open inner channels 24 alternating in the planar direction of the plate. The open outer channels 23 have a width $W_4$ at the surface of the plate and a depth $D_3$. The open inner channels 24 have a width $W_2$ at the surface of the plate smaller than $W_1$ ($W_2 < W_1$) and a depth $D_4$. The width $W_2$ of the inner open channels of the plate can be equal with the width $W_4$ of outer open channels of the plate ($W_2 = W_4$), as depicted in FIG. 4. The widths could also be different. In addition, the width $W_3$ can be different from one inner channel to another. The second plate thickness $H_2$ is greater that the sum of the inner and outer channel depths ($H_2 > D_3 + D_4$) and therefore this plate is a staggered plate. The flow channels 23 constitute the flow field of plate 21 through which fuel (typically hydrogen or methanol) could be distributed to the fuel cell anode. The flow channels 23 are preferably of a semicircular cross-sectional shape.

Figure 5:
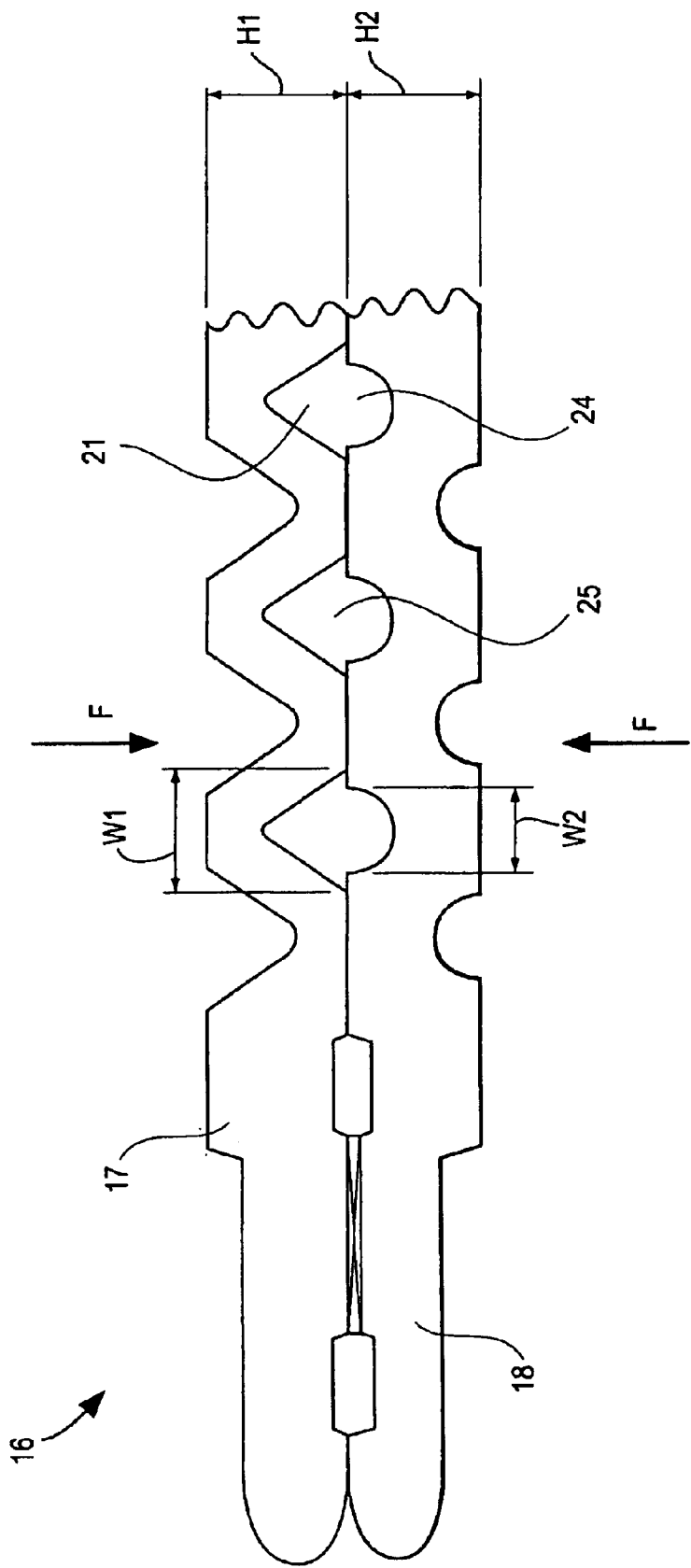
FIG. 5 is a cross-sectional view of a flow field plate assembly comprising a staggered and a corrugated plate.

FIG. 5 shows the two plates 17 and 18 aligned and engaging each other on their inner surfaces such that the inner channels 21 on the inner surface of the first plate align with the inner channels 24 on the inner surface of the second plate, creating a closed inner flow field channel 25 such that each inner channel of the second flow field plate overlaps an inner channel of the first field plate essentially along its entire length.

The widths $W_1$ and $W_2$ of the inner open channels of the two plates are selected such that the difference ($W_1 - W_2$) between the width of the inner flow channels of the first plate 17 and the width of the inner flow channels of the second plate 18 is greater than or equal to the alignment tolerance between the two plates. This ensures that the desired cross-sectional perimeter of the inner closed channel for the coolant is obtained when the plates are aligned within the alignment tolerance. In turn this ensures that the desired hydraulic diameter of the channels is obtained.

The flow field plate assembly shown in FIGS. 2–5 includes a corrugated plate 17 and a staggered plate 18 as mentioned above. The staggered plate 18 is structurally stronger than the corrugated plate and the shape of its flow channels does not change noticeably under the compressive load F. The corrugated plate 17, on the other hand, by itself tends to flatten under compressive load. This effect is more visible if the plates are made of a softer material such as, for example, expanded graphite. Back-to-back corrugated plates forming coolant channels in between are known, but they lack this structural strength. The present configuration overcomes this disadvantage by employing a structurally stronger staggered plate to support the corrugated plate against spreading under the compressive load F. Consequently, the shape of the coolant channels tends to change much less under the compressive load F, which results in less variation in the coolant pressure along the channels.

The channels forming the flow field of the corrugated plate and the flow field of the staggered plate need not have a constant cross-section throughout. In this regard, the width of the channels can vary along their lengths provided that, for at least most of the points along each channel's length, the corrugated plate open inner channel cross-sectional width $W_1$ is greater than the staggered plate open inner channel cross-sectional width $W_2$ ($W_1 > W_2$) and the difference between those widths ($W_1 - W_2$) is within the anticipated alignment tolerance between the corrugated plate and the staggered plate.

The following shows an example of the design of flow field plates that can be employed in a flow field plate assembly of the type depicted in FIGS. 2–5. A corrugated plate of the flow field plate assembly as shown in FIG. 5 has inner and outer channels with a draft angle of 30 degrees, a bottom radius of 0.13 mm and a depth of 0.6 mm. The experimental data obtained during tests performed separately on such a corrugated plate show that over a 40 $\mu$m crushing of the landings the flow field of the corrugated plate losses 0.70 mm of hydraulic diameter for each millimeter of crush, which represents a 26% improvement in crush sensitivity over the results obtained using a typical non-corrugated plate.

The staggered plate's channels have a bottom radius of 0.25 mm with a depth of 0.29 mm for the outer channels and 0.35 mm for the inner channels. The landings of the staggered plate are 0.80 mm at the outer surface of the plate and 0.76 mm at the inner surface of the plate.

While particular steps, elements, embodiments and applications of the present invention have been shown and described, it will be understood, of course, that the invention is not limited thereto since modifications may be made by persons skilled in the art, particularly in light of the foregoing teachings. It is therefore contemplated by the appended claims to cover such modifications as incorporate those steps or elements that come within the scope of the invention.

What is claimed is:

1. A fuel cell flow field plate assembly comprising:
    (a) a first flow field plate having an open inner channel formed on the inner surface of the plate and open outer channels formed on the outer surface of the plate; and
    (b) a second flow field plate having an open inner channel formed on the inner surface of the plate and open outer channels formed on the outer surface of the plate;
wherein the inner surface of the second flow field plate aligns with and engages the inner surface of the first flow field plate such that the engaged inner channels of each plate define a closed inner flow field channel with the inner channel of the second plate overlapping the inner channel of the first plate essentially along its entire length.

2. The flow field plate assembly of claim 1 wherein the open inner channel formed on the inner surface of the first flow field plate has a width $W_1$ at the inner surface of the first plate and the open inner channel formed on the inner surface of the second flow field plate has a width $W_2$ at the inner surface of the second plate, smaller than $W_1$, and the cross-sectional perimeter of the closed inner flow field channel is the sum of the perimeters of the open inner channels of the first and second flow field plates and ($W_1 - W_2$).

3. The flow field plate assembly of claim 1 wherein the first flow field plate has a plurality of open inner channels formed on its inner surface and the second flow field plate has a plurality of open inner channels formed on its inner surface, and each inner channel of the second flow field plate overlaps an inner channel of the first field plate essentially along its entire length.

4. The flow field plate assembly of claim 1 wherein the first flow field plate and the second flow field plate are made of a moldable material.

5. The flow field plate assembly of claim 4 wherein the moldable material is expanded graphite.

6. The flow field plate assembly of claim 1 wherein the first flow field plate is corrugated such that the open inner and outer channels alternate over the planar direction of the plate and the thickness of the plate is less than the sum of the inner and outer channel depths.

7. The flow field plate assembly of claim 1 wherein the second flow field plate is staggered such that the open inner and outer channels alternate over the planar direction of the plate and the thickness of the plate is greater than the sum of the inner and outer channel depths.

8. A fuel cell comprising the flow field plate assembly of claim 1.

9. A method of making a flow field plate assembly comprising aligning and engaging the inner surface of a first flow field plate having an open inner channel formed thereon with the inner surface of a second flow field plate having an open inner channel formed thereon, wherein the engaged inner channels of each plate define a closed inner flow field channel such that the inner channel of the second plate overlaps the inner channel of the first plate essentially along its entire length.

10. A fuel cell flow field plate assembly comprising:
  (a) a first corrugated flow field plate having open inner channels formed on the inner surface of the plate and open outer channels formed on the outer surface of the plate, the open inner and outer channels alternating in the planar direction of the plate, wherein the thickness of the plate is less than the sum of the inner and outer channel depths; and
  (b) a second staggered flow field plate having open inner channels formed on the inner surface of the plate and open outer channels formed on the outer surface of the plate, the open inner and outer channels alternating in the planar direction, wherein the thickness of the plate is greater than the sum of inner and outer channel depths;

wherein the second flow field plate aligns with and engages the inner surface of the first flow field plate such that the inner channels of each plate define a closed inner flow field, whereby the staggered second flow field plate supports the first flow field plate against spreading under compressive load.

11. The flow field plate assembly of claim 10 wherein the first corrugated flow field plate and the second staggered flow field plate are made of a moldable material.

12. The flow field plate assembly of claim 10 wherein the moldable material is expanded graphite.

13. A fuel cell comprising a flow field plate assembly of claim 10.

14. A method of making a flow field plate assembly comprising aligning and engaging the inner surface of a first corrugated flow field plate with the inner surface of a second staggered flow field plate, each of the inner surfaces having channels formed thereon, whereby the inner surface channels of each plate define a closed inner flow field, and whereby the staggered second flow field plate supports the first flow field plate against spreading under compressive load.

* * * * *